Oct. 6, 1970 — W. J. BORTLE — 3,531,887

FISH LURE RETRIEVER

Filed Jan. 16, 1969

William J. Bortle
INVENTOR.

United States Patent Office 3,531,887
Patented Oct. 6, 1970

3,531,887
FISH LURE RETRIEVER
William J. Bortle, 4911 Grand Ave.,
Pittsburgh, Pa. 15225
Filed Jan. 16, 1969, Ser. No. 791,667
Int. Cl. A01k 97/00
U.S. Cl. 43—17.2                                                    9 Claims

ABSTRACT OF THE DISCLOSURE

A retriever for a lure and which comprises a ring and a flexible openwork mesh hook engaging sleeve, and which lends itself to feasible and effective use from a fishing boat or a pier. It is uniquely adaptable for use in conjunction with a lure having a plurality of multiple-pronged fishhooks. The ring is split on one side to allow the ring to be applied to and removed from a fishing line. The sleeve fully encompasses the ring and has a circumferential length substantially equal to the circumference of the ring. It can be successfully and controllably used with one hand, which is necessary when boat fishing, keeping in mind that the rod has to be simultaneously held with the other hand.

---

This invention relates to a lure retriever which is expressly designed and uniquely adapted for use when an angler is confronted with the recurring problem of attempting to dislodge and free a multiple hooked fishing lure from underwater rocks, logs and intertwined debris, and has to do with an innovation which necessitates the use of one hand only for coacting engagement and effectual manipulation, whereby the other hand is available to hold onto the fishing rod and prevent the same from going overboard during movement of the boat.

Anglers and others who are conversant with the field of endeavor herein under consideration are full well aware that it is not new to connect a weighted ring or a sinkable weight of one type or another to a snagged fishing line and allow the same to ride down the line to the snagged lure in hopes of knocking the lure and freeing it by jiggling the weight and the line by which it is held captive. The patent issued to M. C. Richard, 2,676,430, is indicative of the state of the art to which the present invention relates. Such an adaptation necessitates two-handed use and dangling knocker chains are haphazard in performance and experience has shown that inasmuch as the hooks on the plug swivel, the impact chains seldom reach or successfully pound the hooks sufficiently to free and dislodge them.

In carrying out the principles of the instant contribution to the art and as a result of trial and error experimentation it has been found that the captive weighted ring functions, when properly manipulated, to aptly surround the plug and is possessed of the weight and bulk capable of intermittently striking and knocking the overall lure free. It embodies nylon netting of a strength which will withstand the pull needed to straighten a snagged hook in such a way that it can be pulled, yanked free, and acceptably retrieved.

Briefly summarized, the over-all retriever is characterized by a suitably plated steel or equivalent ring so as to be non-corrodible which constitutes the weight or collar and which is of appropriate diameter and cross-section and is split on one side to provide a line passage. The diametrically opposite side is provided with an eyebolt whose eye projects beyond the peripheral surface to permit the lower end of a lifting and lowering and retaining line to be attached thereto. This line is anchored on the boat and held captive and in turn prevents loss of the ring. The ring is slipped over the snagged fishing line and is allowed to gravitate or descend in a now generally well-known manner. While the ring provides the desired weight and bulk for knocking the lure free its effectiveness is greatly increased by encasing the ring in a tough nylon net of tubular form. This net or sleeve is fitted over the ring and is amply large that the loose hanging and netted portions are of a strength and character to withstand a pull which is sufficient to straighten a snagged hook and to pull it free. The nylon tube or sleeve is amply large to provide the looseness required so that the netting surrounds and catches on the hooks. The length of the tube or sleeve is such that the respective end portions are pulled or tucked through the space or passage between the terminal ends of the ring and each terminal end of the sleeve is stitched or bound in a manner to permit the line to be passed through the passage thus available but, under ordinary circumstances, to prevent the line from becoming accidentally displaced from its functioning position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
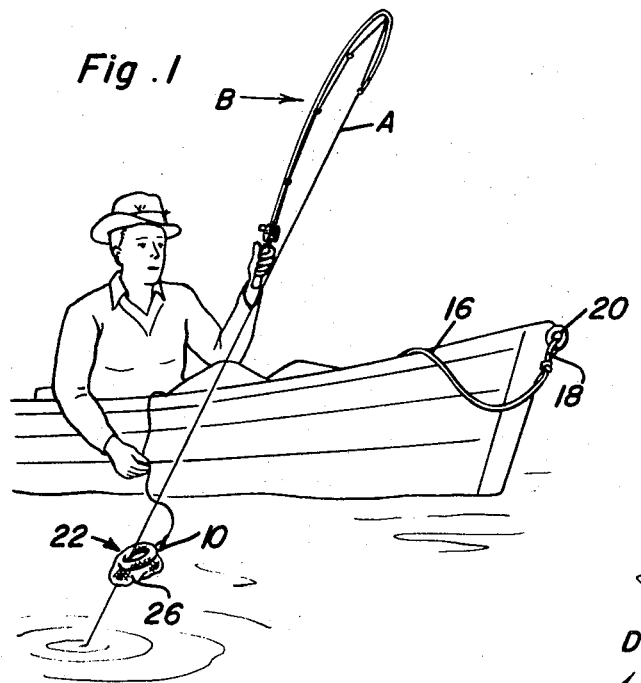
FIG. 1 is a view in perspective showing a fragmentary portion of a fishing boat with an angler seated therein and holding the rod and line with his left hand and allowing the retriever to descend the fishing line while being controlled with the fingers of the right hand.
Figure 3:
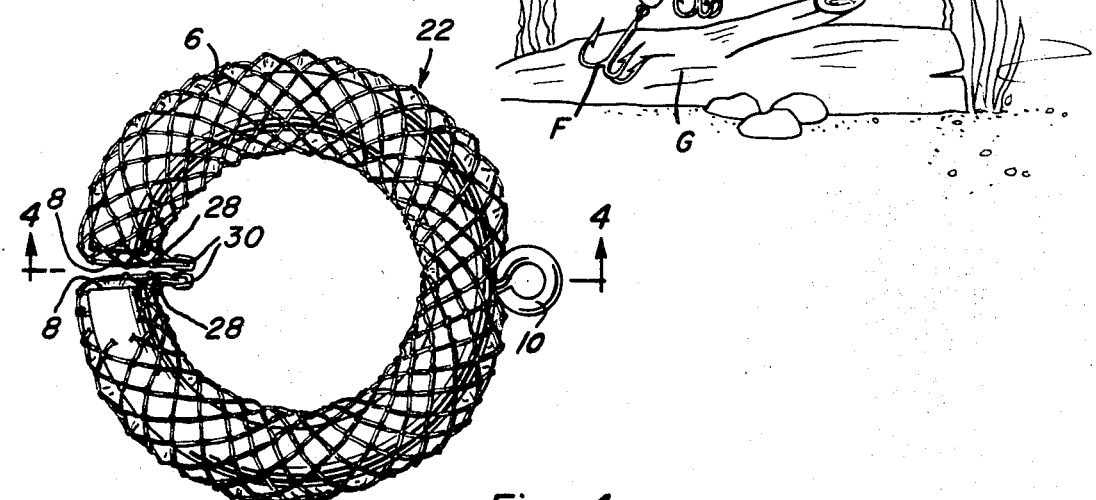
FIG. 3 is a top plan view of the retriever by itself, that is disconnected from the lowering and retrieving line.
Figure 4:
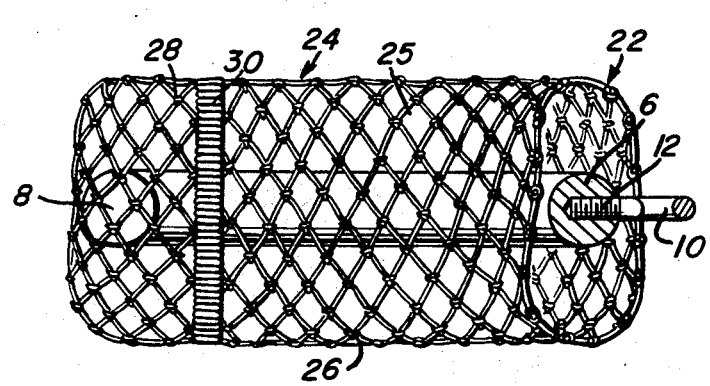
FIG. 4 is a central sectional view taken approximately on the plane of the section line 4—4 of FIG. 3 looking in the direction of the indicating arrows.

With reference now to the views of the drawing, and with the aid of reference numerals and lead lines, it will be seen that the aforementioned split ring or collar is denoted by the numeral 6. This ring will be of varying size and weight. It is non-corrodible and in actual practice has taken the form of a plated and polished steel ring which is circular in cross-section. At the left in FIGS. 3 and 4 it will be seen that the ring is split and that the slightly spaced flattened terminal ends 8 are disposed in spaced apart relationship providing a passage through which the fishing line A can be passed to assume the position shown in FIGS. 1 and 2. The diametrically opposite side of the ring, that is opposite the split ends 8, is provided with an eyebolt 10 whose shank 12 is screwed into a socket provided therefor as shown in FIG. 4. The lower end 14 of the lifting and lowering or retrieving line 16 is suitably attached by tying to the eye 10. The upper end portion 18 of this line can be anchored or fastened on a suitable screw eye or an appropriate anchoring element 20 in the manner shown in FIG. 1. This arrangement as brought out in FIG. 1 is advantageous for the reason that the line 16 should be conveniently available when desired for use so that it can be handled with the right hand as shown in FIG. 1 with the rod B held in the left hand. With further and convenient reference at this time to the arrangement of parts shown in FIG. 2 it will be evident that the lure or plug is denoted at C and several pivoted or swivelly mounted multiple prong fishhooks are denoted at D, E and F.

Figure 2:
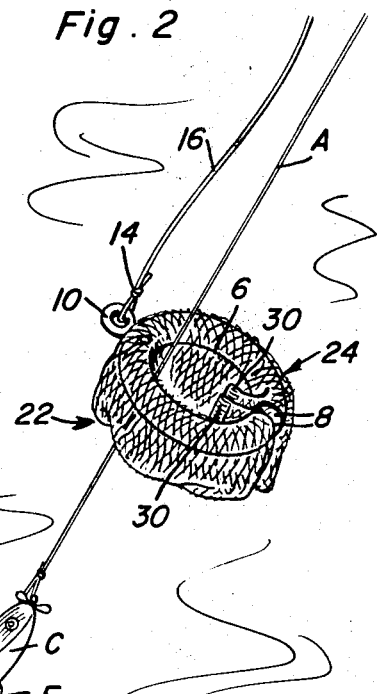
FIG. 2 is also a view in perspective which shows the hook-equipped snagged plug or lure and shows the retriever in a position on the fishing line before it has reached its intended encircling, hook snagging and lure freeing position.

As brought out in FIG. 2 the over-all lure is illustrated as caught on a log G.

A highly important feature of the over-all concept has to do with the fact that the complete ready-to-use lure retriever is denoted by the numeral 22 and embodies the aforementioned hook snagging or trapping means which, more specifically, comprises a tough nylon tube or sleeve which is denoted, generally speaking, by the numeral 24. This sleeve is such that it encases the ring 6 and has a circumferential length substantially equal to the circumference of the ring. The net material from which the sleeve is formed could be self-shape-sustaining or such that generally speaking the upper half-portion 25 is above the level of the ring and the lower half-portion 26 is below the level as brought out in FIG. 4. This view shows the ring and encompassing hook-catching nylon net in a normal position. As before pointed out the respective terminal end portions of the sleeve are such that they can be tucked into and passed through the passage between the terminal ends 8. This is to say, the end portions 28 are tucked between the ends 8 and the extreme terminal ends are stitched or bound as shown at 30. Thus, these tucked-in end portions function to permit the fishing line to be passed through the passage after which it normally stays put by reason of the fact that it cannot be disconnected when once in position, that is, unless done so intentionally and by hand.

When the lure is snagged the boat should be positioned as directly above the same as possible with the rod in one hand. Then the angler picks up the retriever with the free hand and places it over the fishing line through the opening provided in the ring. The fishing line pushes the lapped over netting through the ring simultaneously. The netting then on the inside of the ring prevents the fishing line from coming back out of the ring, that is the passage or opening. This is not necessarily 100% effective as nothing is lost for the reason that the retriever can be placed back on the fishing line. Allow retriever to descend to lure. If other than front hook is snagged, retriever will envelop lure and readily fasten to a hook. In case front hook is snagged, alternate tightening and slackening of fishing line and retrieving line will dance retriever and place it in contact with other hooks. In this case, if lure be small, retriever may somersault and the lower end of retriever pass over end of lure and engage hooks.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A retriever for a multiple hooked fishing lure comprising a ring of an inside diameter capable of surrounding said hook-equipped lure, said ring being split on one side in a manner that it can be readily applied to and removed from a fishing line and being amply heavy that it can descend the fishing line and then be utilized at will to strike and knock the lure in a manner to free it, said ring also having an outer peripheral surface, a lowering and retrieving line having a lower end connected to the outer peripheral surface of said ring, and flexible openwork mesh hook engaging lure retrieving sleeve-like means fully encompassing said ring and of a strength to cope with and withstand a line actuated pull capable of straightening a snagged hook and freeing it, the circumferential length of said sleeve-like means being substantially equal to the circumference of said ring whereby to retrieve said lure.

2. The retriever defined in and according to claim 1, and wherein said outer peripheral surface of said ring comprises an outstanding line attaching eyebolt to which said lower end is connected.

3. The retriever defined in and according to claim 1, and wherein said ring is uniform in transverse cross-section and is made of non-corrodible material.

4. The retriever defined in and according to claim 1, and wherein said ring is made of solid surface-plated non-corrodible metal.

5. The retriever defined in and according to claim 1, and wherein said sleeve-like means is made of flexible openwork nylon netting.

6. For use when fishing from a boat or a pier, a retriever for a multiple hooked fishing lure comprising, in combination, a split ring of an inside diameter capable of fitting itself over and surrounding the hooked lure, said ring being such in weight that when it is manually hitched on the fishing line it sinks, rides down said line and strikes the hooked lure in a manner to dislodge the hooks and prepare the lure for retrieval, a ring lowering and retrieving line having a lower end connected to an outer peripheral surface of said ring at a point diametrically opposite the split portion of said ring, and a flexible openwork mesh hook snagging and lure retrieving sleeve loosely encompassing said ring, the circumferential length of said sleeve being substantially equal to the circumference of said ring.

7. The retriever defined in and according to claim 6, and wherein said sleeve is made of nylon netting, said sleeve having free laterally inwardly directed terminal ends tucked into and through a restricted passage existing between the end portions of said split ring, the respective terminal ends being individually stitched together and closed to maintain the sleeve against displacement from the ring while, at the same time permitting the retrieving line to be manually inserted into the ring by way of said passage and retained by said terminal ends.

8. The retriever defined in and according to claim 7, and wherein said sleeve is of a length greater than the circumference of the ring and is of a cross-section, when expanded, appreciably greater than the cross-section of the ring, whereby the sleeve is flexibly free and has the inherent capability of adapting itself to ever-varying hook snagging, pulling and freeing needs.

9. The retriever defined in and according to claim 6, said ring being of uniform transverse cross-section and being made of surface-plated non-corrodible metal and an outstanding eyebolt fixedly mounted on said outer peripheral surface, the aforementioned lower end of said retrieving line being tied and connected to said eyebolt.

References Cited
UNITED STATES PATENTS

| | | | |
|---|---|---|---|
| 1,982,132 | 11/1934 | Boles | 43—5 |
| 2,653,372 | 9/1953 | Johnson et al. | 43—7 |
| 2,676,430 | 4/1954 | Richard | 43—17.2 |
| 2,801,489 | 8/1957 | Gehring | 43—17.2 |
| 2,940,203 | 6/1960 | Carter | 43—17.2 |
| 3,163,955 | 1/1965 | Lockwood | 43—17.2 |
| 3,296,730 | 1/1967 | Leverdingen | 43—17.2 |
| 3,315,399 | 4/1967 | Couture | 43—17.2 |

SAMUEL KOREN, Primary Examiner

J. H. CZERWONKY, Assistant Examiner